(No Model.)
S. T. CULP.
SHOW STAND.
No. 434,414. Patented Aug. 12, 1890.
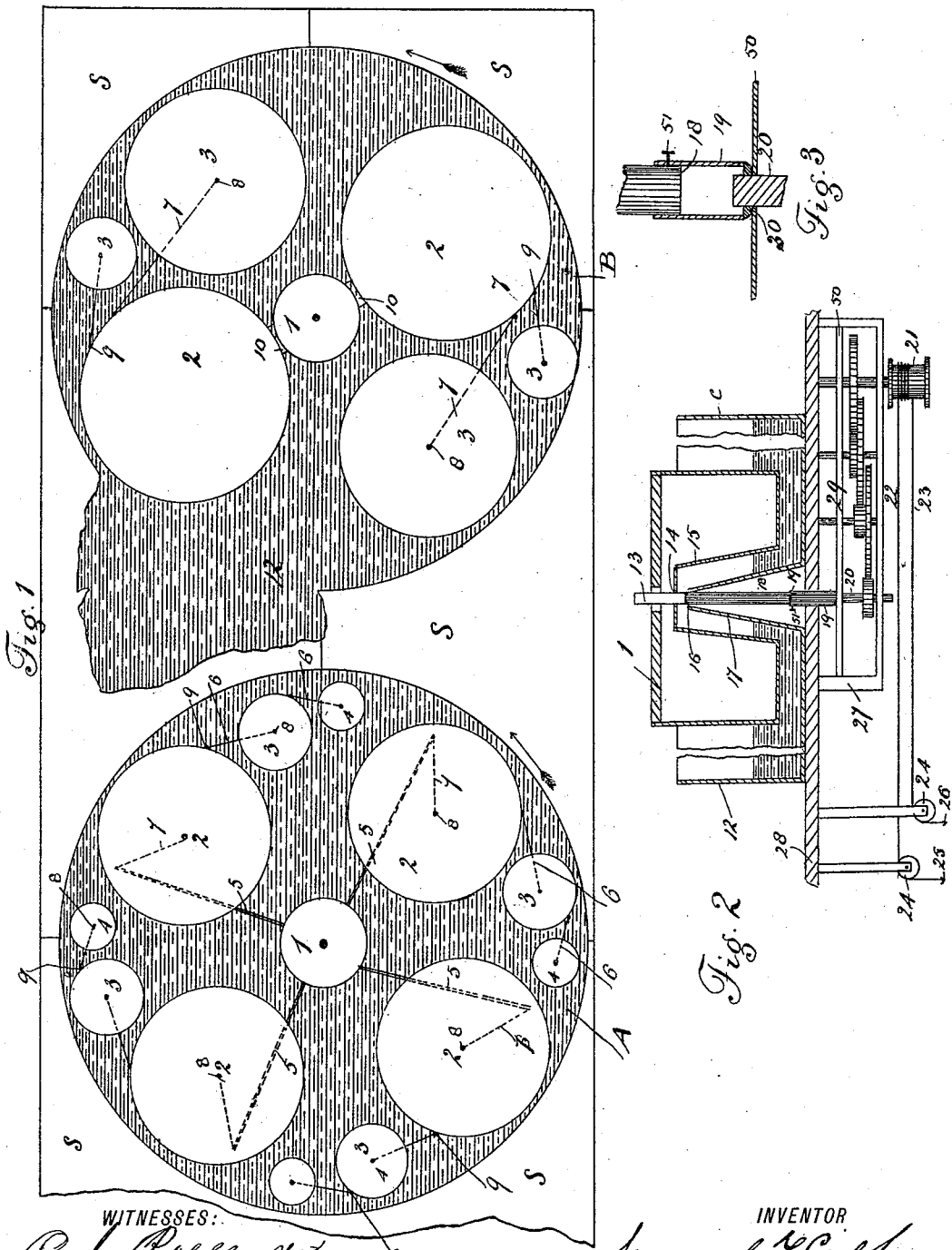
WITNESSES:
INVENTOR
ATTORNEY

UNITED STATES PATENT OFFICE.

SAMUEL T. CULP, OF DENVER, COLORADO, ASSIGNOR OF ONE-THIRD TO CALVIN W. LITTLE, OF SAME PLACE.

SHOW-STAND.

SPECIFICATION forming part of Letters Patent No. 434,414, dated August 12, 1890.

Application filed March 13, 1890. Serial No. 343,785. (No model.)

*To all whom it may concern:*

Be it known that I, SAMUEL T. CULP, a citizen of the United States, residing at Denver, in the county of Arapahoe and State of Colorado, have invented certain new and useful Improvements in Show-Stands; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in show-stands floating upon water or other liquid exposed in a basin or tank; and the object of my invention is to operate any desired number of distinct and separate floats by connecting the same either directly or indirectly with a central revolving vessel or float supported upon water or other liquid, the revolving vessel being operated by a spindle extending through its center and connected with suitable propelling mechanism underneath, the whole device being simple in construction, economical in cost, easily operated, and not liable to get out of repair, and reliable and efficient for the purpose intended.

To these ends my invention consists of the features, arrangements, and combinations hereinafter described and claimed.

In the drawings is illustrated an embodiment of my invention, in which—

Figure 1 is a top or plan view of my improved device, illustrating its operation in two different forms. Fig. 2 is a view, partially in elevation and partially in section, showing the manner of operating the central revolving vessel with which the surrounding floats are connected. Fig. 3 illustrates the connection between the rotating spindle and the propelling clock mechanism.

In these views let the reference-letter C designate a liquid-containing vessel of any suitable size and shape and as herein shown being rectangular in form. Let the reference-numeral 12 designate the liquid in this basin, which is partially concealed by the sectional cover S, a portion of this cover being broken away in the central portion of the view to show the liquid underneath. Sections S are so shaped that when in position two circular openings or compartments A and B, of any suitable size, are left in the basin where the liquid is exposed. In the center of each opening A and B is located a vessel 1, which rests upon the liquid in the tank. Vessel 1 is hollow and provided with a frustum-shaped tube 15, connected with or formed integral with its bottom. Tube 15 surrounds a similar-shaped tube 17, extending from the bottom of the tank C. This tank rests upon a suitable platform or support 28, to the bottom of which is secured the clock-work mechanism 29, inclosed by a casing 27, and, as shown in the drawings, operated by a cord 22 23, wound upon a drum 21, said cord passing over pulleys 24 24 and having weights of unequal gravity connected with its extremities 25 and 26, said weights not being shown in the drawings.

Instead of the drum and weights, a spring may be used to operate the clock-work. This clock-work operates a spindle extending up through platform 28, tubes 15 and 17, and the top of the vessel 1. This spindle is connected at its lower extremity, by means of a set-screw 51, with a hollow cylindrical tube or ferrule 19, provided with an angular opening in its lower extremity 30, which rests upon a suitable stationary base 50. A pin 20, connected with the clock-work, enters the angular opening 30 in the bottom of tube or ferrule 19, said pin being of a corresponding shape, so that the spindle and pin rotate in unison. This joint is loosely formed, so that the spindle may be inclined to the plane of the horizontal without disturbing the normally-vertical position of pin 20, the position of which must be uniform, in order to obtain the best results from the action of the propelling mechanism, with which it is directly connected. The spindle is cylindrical where it engages tube 17 and square or other angular shape, as shown at 13, where it engages tube 15, and the top of vessel 1, since tube 17 is stationary while the vessel moves with the rotating spindle, is sufficiently loose to allow said vessel a free vertical movement therein, since the depth to which the vessel will sink in the water is not uniform, being determined by the weight or load placed thereon.

In Fig. 1, as before stated, are shown two forms illustrating different means of connecting surrounding floats with the central vessel 1, from which said floats derive their movement. In circular compartment B two floats, each designated by the numeral 2, are rigidly secured to and turn with vessel 1 by virtue of a suitable connection 10. Connected with each float 2, by means of suitable cords 7 or their equivalents, are other floats 3 3. Cords 7, as shown in the drawings, are secured at one extremity to the periphery of floats 2, and at the opposite extremity to a button or pin 8, made fast to the center of the bottom of the floats 3 3, in such a manner that the last-named floats may revolve readily and independently in a reversed direction from that of their forward movement whenever they engage the adjacent edges or walls of their circumferential inclosure, the centrifugal force acquired by the floats during their forward rotary movement having a tendency to maintain them in contact with the outer walls or rim of the circular compartment in which they move. Floats 3 are so placed with reference to floats 2 that the former shall be in the rear of the latter, the direction of movement being indicated in the drawings by arrows.

In circular opening A the vessel 1 is provided with the rigid arms 5 5, &c., made fast thereto at their inner extremities and connected at their outer extremities with cords 7 or their equivalents, said cords being loosely secured at their opposite extremities to suitable pins or buttons 8, made fast to the centers of the bottoms of the floats.

To each float 2 of compartment A is suitably secured, by means of cords 6, a trailing float 3, while to float 3 there is connected in the same manner another float 4, floats 3 and 4 being at all times in the rear of float 2. The relative position of the floats is considered with reference to the direction of movement, which is indicated by the arrows, as before stated.

The goods or merchandise to be exhibited are placed upon the floats, which may be of any desired size and number to suit the taste of the merchant or to answer the purpose of a show-stand or merchandise-exhibitor.

Having thus described my invention, what I claim is—

1. A revolving show-stand or merchandise-exhibitor consisting of a liquid-containing basin or tank, a central vessel 1, resting upon the liquid in the tank, said vessel being retained in place and operated by a rotating spindle, said spindle consisting of two sections 18 and 20, section 18 being provided with a socket 3 of angular shape, in which is received one extremity of section 20, one or more separate floats 2, resting upon the liquid in the basin and directly connected with vessel 1, the action of which controls the movement of floats 2, substantially as described.

2. A show-stand or merchandise-exhibitor consisting of a liquid-containing reservoir or basin, a central vessel 1, resting upon the liquid in the tank, said vessel being operated and retained in place by a rotating spindle, said spindle consisting of two sections 18 and 20, section 18 being provided with a socket 3 of angular shape, in which is received one extremity of section 20, vessel 1 being directly connected with one or more floats 2, each float 2 being directly or indirectly connected with one or more trailing floats, substantially as described.

3. A show-stand or merchandise-exhibitor consisting of a liquid-containing reservoir or basin, a central vessel 1, resting upon the liquid in the reservoir, said vessel being retained in place and operated by a suitable rotating spindle, said spindle consisting of two sections 18 and 20, section 18 being provided with a socket 3 of angular shape, in which loosely fits one extremity of section 20, forming a joint to permit the inclination of the upper portion of the spindle without disturbing the vertical position of the lower portion connected with the propelling mechanism, substantially as described.

4. In a merchandise-exhibitor, an open reservoir or tank C, having the water 12 exposed in compartments A and B of suitable size and shape, and a vessel 1, placed in the center of each compartment and operated by a rotating spindle, said spindle consisting of two sections 18 and 20, section 18 being provided with a socket 3 of angular shape, in which is received one extremity of section 20, substantially as described.

5. A show-stand or merchandise-exhibitor consisting of a liquid-containing reservoir or basin, a central vessel 1, resting upon the liquid in a circular compartment A or B of the tank, said vessel being operated and retained in place by a rotating spindle, vessel 1 being rigidly connected with one or more floats 2, each float having a cord or its equivalent secured at one extremity to its periphery, the opposite extremity of the cord being secured to a short pin or button made fast to the center of a trailing float 3 in such a manner as to permit the trailing float to revolve freely in a reversed direction from that of its forward movement when in contact with the inner rim or wall of the surrounding circular compartment, substantially as described.

In testimony whereof I affix my signature in presence of two witnesses.

SAMUEL T. CULP.

Witnesses:
G. J. ROLLANDER,
FRED W. FELDWISCH.